Nov. 8, 1932.　　　A. COORS　　　1,887,345

MALTED MILK CONTAINER

Filed Aug. 6, 1931

Inventor
Adolph Coors.
By A. J. O'Brian
Attorney

Patented Nov. 8, 1932

1,887,345

UNITED STATES PATENT OFFICE

ADOLPH COORS, OF GOLDEN, COLORADO

MALTED MILK CONTAINER

Application filed August 6, 1931. Serial No. 555,469.

This invention relates to improvements in closures for containers for dispensing malted milk and other articles.

Malted milk is used very extensively at soda fountains and it is therefore customary to provide containers from which the malted milk can be readily dispensed and which will keep it in sanitary condition and protect it from dust and dirt.

It is the object of this invention to produce a malted milk container that shall be so constructed that it will automatically close the opening after the attendant has removed the necessary amount of its contents and which will therefore avoid the objection that applies to containers where automatic closing covers are not provided.

This invention, briefly described, consists of a short hollow cylindrical container having a base on one side and an opening on the side directly opposite from the base. A cover is provided for closing the opening and this cover has one side concave so as to fit the outer surface of the container and is attached to one end of an arm whose other end extends downwardly along one end of the container and is secured to a pivot pin mounted at the center of the cylindrical container. A spring is provided which has one end attached to the pivot and the other to the arm and is so tensioned that it tends to move the cover to closed position. For the purpose of limiting the movements of the cover, the concave surface of the latter has been provided with an inwardly extending lug that engages the sides of the opening. This lug is located near one edge of the cover and therefore permits it to close and also to be moved to substantially fully open position.

Figure 1:
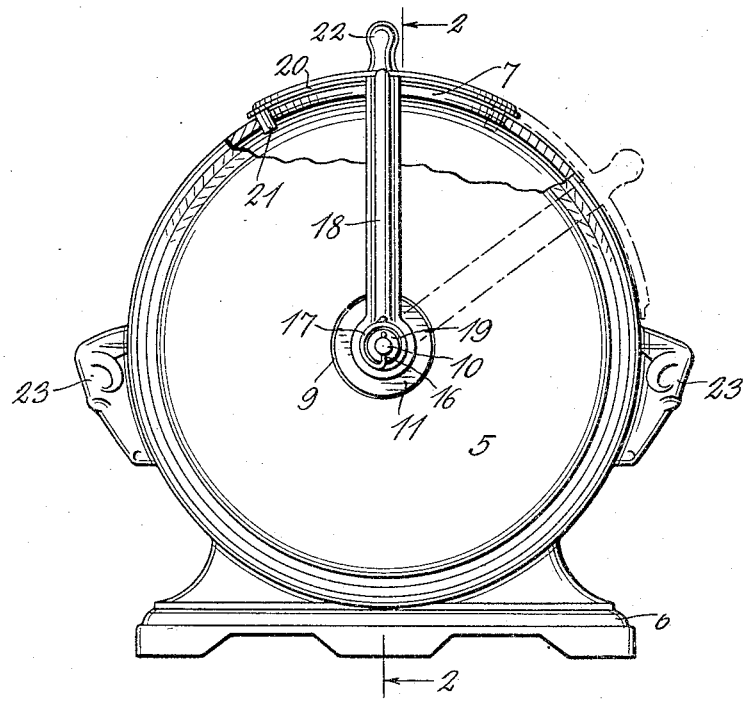
Figure 2:
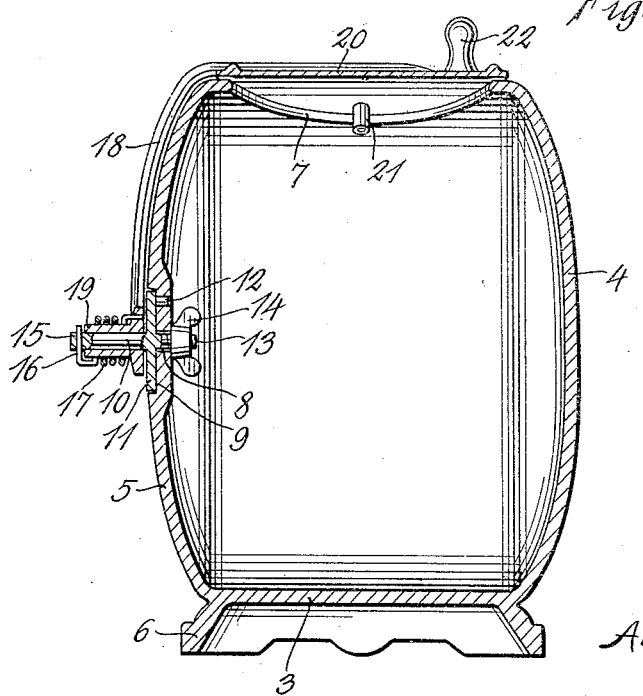

Having thus briefly described the invention, the same will now be described in detail, and for this purpose reference will be had to the accompanying drawing in which the preferred embodiment of the invention has been illustrated, and in which:

Fig. 1 is a side elevation of the container and dispensing device that forms the subject of this invention, a portion being shown in section; and Fig. 2 is a section taken on line 2—2, Fig. 1.

The container is preferably formed from some ceramic material such as porcelain and has a cylindrical wall 3, the ends of which are connected by means of end members 4 and 5. The end members are slightly concave on their inner surfaces and convex on their outer surfaces as indicated in Fig. 2. One side of the container is provided with a base 6 whose under surface is in a plane parallel with the axis of the cylindrical member. The cylindrical wall has an opening 7 directly above the base and this opening may be cylindrical or of any other suitable shape. Side 5 is provided with an axial opening 8 that extends entirely through the same and has a cylindrical recess 9 in its outer surface. The pivot pin 10 is provided with a flange 11 that rests in the recesses and the inner surface of this flange is provided with a pin 12 that projects into an opening in the bottom of the recess in the manner shown in Fig. 2. The pivot pin extends some distance to the inside of flange 11 and has a threaded end 13 that projects into the interior of the container. A wing nut 14 is secured to the threaded end and holds the pivot pin in place. The outer end of the pivot pin has an opening 15 for the reception of the end 16 of the spring 17 to which reference will be made as the description proceeds. An arm 18 is provided with a tubular hub 19 through which the pivot pin extends. Arm 18 is curved so as to lie quite closely against the outer surface of end member 5 and has its upper end attached to the cover 20. Cover 20 has a size slightly larger than the opening and is curved so that its inner surface conforms to the curvature of the outer surface of the cylindrical container. A stop 21 is secured to the inner surface of the cover near one edge thereof and this limits the movement of the cover in both directions as indicated in Fig. 1 by full and dotted lines. A short handle 22 projects outwardly from the outer surface of the cover. The inner end of spring 17 extends into an opening in the arm in the manner shown in Fig. 2 and the spring is so tensioned that it tends to move the parts to cover closing position as indicated by full lines in Fig. 1. When the attendant desires to remove some of the contents from the container, he grasps the handle 22 and moves it and the cover to dotted line position shown in Fig. 1. Spring 17 is so connected that when the cover is moved from full line to dotted line position, the tension of the spring is increased and as soon as the attendant releases the handle 22, the cover moves to closed position. For convenience in handling the container, the latter has been provided with integral handles 23.

From the above description it will be seen that the container that forms the subject of this invention is of a simple and pleasing construction and is provided with a cover that can be rotated through a small angle about the axis of the cylindrical container for the purpose of uncovering and covering the opening through which the material is introduced and removed. The cover is connected to the container by means of a pivot and a spring in such a manner that it will automatically move to closed position when released and therefore the container will always be properly covered except during the short intervals of time when it is in actual use.

Having described the invention what is claimed as new is:

1. A device for dispensing malted milk or the like, comprising a container having a cylindrical body portion and convex ends, the cylindrical portion having a base on one side and an opening diametrically opposite the base, one of the ends having a central opening and an eccentric opening, a plate located over the central opening, said plate having a central threaded projection which projects through the central opening in the end and which is provided with a nut for holding the plate in place, the plate having a pivot pin projecting from its outer surface and a short pin projecting from its inner surface in position to engage in the eccentric opening, a cover for the opening in the top of the container, the inner surface of the cover having a curvature substantially the same as that of the outside of the cylindrical portion, an arm secured to one side of the cover and extending over the end of the container to the pivot pin, the end of the arm having a bearing for the reception of the pivot pin, means acting on the cover to move it towards closed position, and a stop carried by the cover and extending into the opening for limiting its movement in both directions.

2. A device for dispensing malted milk comprising, a container having a cylindrical body portion and convex ends, the cylindrical portion having a base on one side and an opening diametrically opposite the base, one of the ends having a recess in its outer surface which is concentric with the cylindrical wall of the container, the bottom of the recess having a central opening and an eccentric opening, a plate located in the circular recess, said plate having a central threaded projection on one side which projects through the central opening in the recessed portion and which is provided with a nut for holding the plate in place, the circular plate having a pivot pin projecting from its outer surface and a short pin projecting from its inner surface into the eccentric opening, a cover for the opening in the top of the container, the inner surface of the cover having a curvature substantially the same as that of the outside of the cylindrical portion, an arm secured to one side of the cover and extending over the end of the container to the pivot pin, the end of the arm having a bearing for the reception of the pivot pin, means acting on the cover to move it towards closed position, and a stop carried by the cover and extending into the opening for limiting its movement in both directions.

In testimony whereof I affix my signature.

ADOLPH COORS.